United States Patent
Klein

(10) Patent No.: US 9,846,345 B2
(45) Date of Patent: Dec. 19, 2017

(54) COLORED PIGMENT PARTICLES FOR ELECTROPHORETIC DISPLAYS

(71) Applicant: EMPIRE TECHNOLOGY DEVELOPMENT LLC, Wilmington, DE (US)

(72) Inventor: Josef Peter Klein, Vashon, WA (US)

(73) Assignee: Empire Technology Development LLC, Wilmington, DE (US)

(*) Notice: Subject to any disclaimer, the term of this patent is extended or adjusted under 35 U.S.C. 154(b) by 22 days.

(21) Appl. No.: 14/771,400

(22) PCT Filed: Feb. 28, 2013

(86) PCT No.: PCT/US2013/028296
§ 371 (c)(1),
(2) Date: Aug. 28, 2015

(87) PCT Pub. No.: WO2014/133526
PCT Pub. Date: Sep. 4, 2014

(65) Prior Publication Data
US 2016/0018716 A1  Jan. 21, 2016

(51) Int. Cl.
*G02B 26/00* (2006.01)
*G02B 26/08* (2006.01)
(Continued)

(52) U.S. Cl.
CPC ............ *G02F 1/167* (2013.01); *C09B 1/16* (2013.01); *C09B 1/36* (2013.01); *C09B 5/62* (2013.01);
(Continued)

(58) Field of Classification Search
USPC ............ 359/237, 290–292, 295, 296, 298, 359/321–323, 267, 270–273
See application file for complete search history.

(56) References Cited

U.S. PATENT DOCUMENTS 3,725,101 A    4/1973   Kuhne et al.
4,377,390 A    3/1983   Schüendehüette et al.
(Continued)

FOREIGN PATENT DOCUMENTS

| GB | 1508238 A | 4/1978 |
|----|-----------|--------|
| WO | 2008003604 A2 | 1/2008 |
| WO | 2011075720 A1 | 6/2011 |

OTHER PUBLICATIONS

"E Ink," Wikipedia, accessed at http://web.archive.org/web/20130506162812/http://en.wikipedia.org/wiki/E_Ink, last modified on Apr. 8, 2013, pp. 5.

(Continued)

*Primary Examiner* — Brandi Thomas
(74) *Attorney, Agent, or Firm* — Pepper Hamilton LLP

(57) ABSTRACT

Electrophoretic displays with an electrophoretic medium having charged pigmented microparticles are disclosed. The microparticles are charged linking molecules polymerized with chromophores of various colors so that microparticles in a variety of colors may be produced. Methods for producing the microparticles and using the microparticles in an electrophoretic display are also disclosed. Such microparticles may be provided separately, or kits may be provided for producing the microparticles.

10 Claims, 5 Drawing Sheets

(51) Int. Cl.
  G02F 1/29    (2006.01)
  G02F 1/167   (2006.01)
  C09B 1/16    (2006.01)
  C09B 1/36    (2006.01)
  C09B 5/62    (2006.01)
  C09B 43/32   (2006.01)
  G02B 5/22    (2006.01)

(52) U.S. Cl.
  CPC .............. *C09B 43/32* (2013.01); *G02B 5/223* (2013.01); *G02F 2001/1678* (2013.01)

(56) References Cited

U.S. PATENT DOCUMENTS

| | | | |
|---|---|---|---|
| 4,497,735 | A | 2/1985 | Olsen et al. |
| 5,520,707 | A | 5/1996 | Lim et al. |
| 6,194,488 | B1 | 2/2001 | Chen et al. |
| 6,853,477 | B2 | 2/2005 | Nomoto et al. |
| 7,666,410 | B2 | 2/2010 | Lye et al. |
| 7,951,938 | B2 | 5/2011 | Yang et al. |
| 2006/0135774 | A1 | 6/2006 | Weber et al. |
| 2009/0296195 | A1 | 12/2009 | Fontana et al. |
| 2010/0120739 | A1 | 5/2010 | Smith et al. |
| 2010/0148385 | A1 | 6/2010 | Balko et al. |
| 2010/0251930 | A1 | 10/2010 | Shakhnovich |
| 2010/0264382 | A1 | 10/2010 | Feldhues et al. |
| 2010/0290103 | A1 | 11/2010 | Fontana et al. |
| 2011/0242641 | A1 | 10/2011 | Du et al. |
| 2012/0229884 | A1* | 9/2012 | Hayoz .................. C09B 69/008 359/296 |
| 2012/0313049 | A1 | 12/2012 | Du et al. |

OTHER PUBLICATIONS

Barasch, D., et al., "Novel anthraquinone derivatives with redox-active functional groups capable of producing free radicals by metabolism: are free radicals essential for cytotoxicity?," European Journal of Medicinal Chemistry, vol. 34, Issue 7-8, pp. 597-615 (Jul. 1999).

Buchstaller, H-P., et al., "Design and synthesis of isoquinolines and benzimidazoles as RAF kinase Inhibitors," Bioorganic & Medicinal Chemistry Letters, vol. 21, Issue 8, pp. 2264-2269 (Apr. 15, 2011).

Chen, Y., et al., "Flexible active-matrix electronic ink display," Nature, vol. 423, pp. 136-137 (May 8, 2003).

Comiskey, B., et al., "An electrophoretic ink for all-printed reflective electronic displays," Nature, vol. 394, pp. 253-255 (Jul. 16, 1998).

Craig, L. E., and Tarbell, D. S., "Curariform activity and chemical structure. IV. Synthesis in the piperidine series," Journal of America Chemical Society, vol. 71, Issue 2, pp. 465-467 (Feb. 1949).

Das, J., et al., "An easy access to aryl azides from aryl amines under neutral conditions," Synthesis, No. 11, pp. 1801-1806 (Nov. 2005).

Huang, C., et al., "Perylene-3, 4, 9, 10-tetracarboxylic acid diimides: Synthesis, physical properties, and use in organic electronics," Journal of Organic Chemistry, vol. 76, Issue 8, pp. 2386-2407 (Mar. 16, 2011).

International Search Report and Written opinion for international application No. PCT/US13/28296, dated Jul. 11, 2013.

Kim, C. A., et al., "Microcapsules as an electronic ink to fabricate color electrophoretic displays," Synthetic Metals, vol. 151, Issue 3, pp. 181-185 (Aug. 15, 2005).

Kricheldorf, HR., et al., "Aliphatic poly(ether amide)s by polycondensation of activated sebacic acid derivatives," Journal of Macromolecular Science Part A Part A: Pure and Applied Chemistry, vol. 44, Issue 2, pp. 119-124 (Feb. 7, 2007).

Oh, S. W., et al., "Encapsulated-dye all-organic charged colored ink nanoparticles for electrophoretic image display," Advanced Materials, vol. 21, Issue 48, pp. 4987-4991 (Dec. 28, 2009).

Yu, D. G., et al., "Preparation and characterization of acrylic-based electronic inks by in situ emulsifier-free emulsion polymerization for electrophoretic displays," Chemistry of Materials, vol. 16, Issue 23, pp. 4693-4698 (Sep. 3, 2004).

Yu, D-G., et al., "Preparation and characterization of electronic inks encapsulation for microcapsule-type electrophoretic displays (EPDs)," Journal of Industrial and Engineering Chemistry, vol. 13, No. 3, pp. 438-443 (May 2007).

Zhao et al., Synthesis, cytotoxicity and cucurbituril binding of triamine linked dinuclear platinum complexes, Dalton Trans., May 18, 2009, pp. 5190-5198.

\* cited by examiner

COLORED PIGMENT PARTICLES FOR ELECTROPHORETIC DISPLAYS

CLAIM OF PRIORITY

This application is a U.S. national stage filing under 35 U.S.C. §371 of International Application No. PCT/US2013/028296 filed Feb. 28, 2013 entitled "COLORED PIGMENT PARTICLES FOR ELECTROPHORETIC DISPLAYS," which is incorporated herein by reference in its entirety.

BACKGROUND

Electrophoretic displays, such as those that may be used in e-reader devices are displays based on the electrophoresis phenomenon influencing charged pigment particles suspended in a dielectric solvent. The pigment particles may be of a size of about 1-2 microns in diameter, carry a charge, and are able to migrate within the solvent under the influence of externally applied charges from adjacent electrode plates.

An electrophoretic fluid may have at least one type of charged pigment particles dispersed in the solvent or solvent mixture, and the electrophoretic fluid may be pigmented with a contrasting color to the color of the particles, for example, white particles in a colorless or clear solvent. Upon application of a charge to the electrode plates, the charged particles may be caused to migrate towards or away from the plates, by attraction to a plate of opposite charge, and repulsion away from a plate of similar charge. In this manner, the color showing at one surface may be either the color of the solvent if the particles are attracted away from that surface, or may be the color of the pigment particles if the particles are attracted to that surface. Reversal of plate polarity will cause the particles to migrate back to the opposite plate, thereby reversing the color.

Alternatively, an electrophoretic fluid may have two types of pigment particles of contrasting colors (for example, white and black) and carrying opposite charges, dispersed in a clear solvent or solvent mixture. Upon application of a voltage difference between the two electrode plates, the two types of pigment particles may move to opposite ends (top or bottom) in a display cell. Thus, one or the other of the colors of the two types of pigment particles would be visible at the viewing side of the display cell.

The pigment particles may be ionic or ionizable microparticles composed of a polymer encapsulating white, black or otherwise colored molecules. The particles may be formed from a non-covalent bonding of polymer matrix to encapsulated dye molecules, and because of the non-covalent bonding may lose color over time, or may be broken down by radiant energy and no longer function as designed.

For electrophoretic displays, there remains a need for charged pigment particles which have improved color-fastness and photostability.

SUMMARY

Micro- and nano-particle based approaches to electrophoretic displays employing dye molecules that are covalently linked to the polymeric particle matrix display improved color-fastness and photostability.

In an embodiment, an electrophoretic display includes at least one first electrode layer and an electrophoretic medium disposed adjacent at least one first electrode layer. The electrophoretic medium includes at least one electrically charged particle disposed in a transparent fluid and capable of moving through the transparent fluid upon application of an electrical field to the transparent fluid. At least one charged particle includes an alternating copolymer of a chromophore and a charged linker molecule.

In an embodiment, an electrophoretic medium includes at least one electrically charged particle disposed in a transparent fluid and capable of moving through the transparent fluid upon application of an electrical field to the transparent fluid. At least one charged particle includes an alternating copolymer of a chromophore and a charged linker molecule.

In an embodiment, a charged pigment particle includes an alternating copolymer of a chromophore and a charged linker molecule.

In an embodiment, a method for producing charged pigment particles includes copolymerizing chromophores with charged linker molecules to form charged and colored microparticles.

In an embodiment, a kit for producing charged pigment particles includes chromophores and charged linker molecules for being copolymerized with the chromophores to form charged pigment particles.

In an embodiment, a method for using an electrophoretic display is disclosed. The display includes at least one first electrode layer and an array of microcapsules disposed adjacent at least one first electrode layer with a first side of the microcapsules adjacent the layer and a second side of the microcapsules away from the electrode layer. Each microcapsule includes an electrophoretic medium having at least one electrically charged particle disposed in a transparent fluid and capable of moving through the transparent fluid upon application of an electrical field to the transparent fluid. At least one charged particle includes an alternating copolymer of a chromophore and a charged linker molecule. The method includes selectively applying an electric charge to the electrode layer adjacent selected ones of the microcapsules to cause At least one charged particle in the selected microcapsules to move away from the electrode layer to provide a visual color corresponding to the chromophore at the second side of the selected microcapsules.

DETAILED DESCRIPTION

Charged polymeric pigmented particles, as discussed in more detail below, provide colors in both flexible, and non-flexible display technologies, and provide improved hue, brightness, color intensity, color-fastness and photostability compared to non-polymer-bound pigments and dyes. Electrophoretic displays incorporating such charged particles may be used in a variety of devices, such as cellular telephones, e-book readers, tablet computers, portable computers, smart cards, signs, watches, or shelf labels, to name a few examples.

In embodiments discussed below, colored pigment particles, such as those used in electrophoretic displays, may be polymers of at least one chromophore and at least one charged linker molecule. The polymer may be a polyamide or polyimide, wherein the polyamide or polyimide may include monomer units of an analog of a pigment molecule, or chromophore, and a linker molecule incorporating a cationic quaternary functionality. In certain other embodiments, the polymer may be a copolyimide or a copolyamide.

Figure 1A:
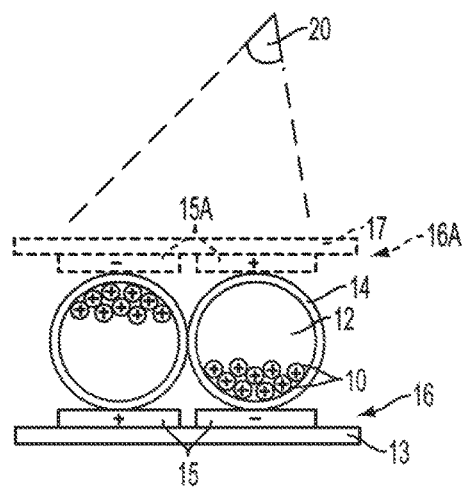
FIGS. 1A and 1B are representative configurations of an electrophoretic display according to an embodiment.
Figure 1B:
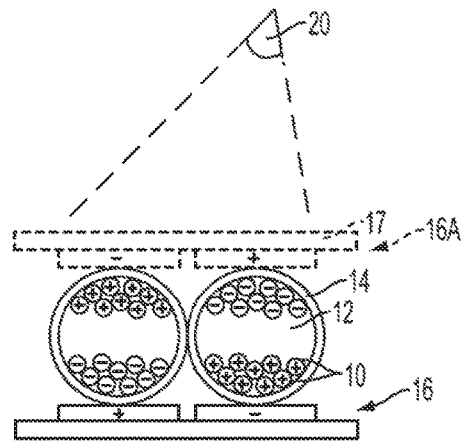

The pigment monomer units and charged linker molecule monomer units may be configured in accordance with a polymerization process so that the resulting charged pigmented polymer forms particles 10, as depicted in FIGS. 1A and 1B. The particles 10 may be nanoparticles, microparticles, nanospheres, or microspheres, and will, for simplification, be generally referred to as microparticles herein. A pigment molecule, or chromophore, may be any molecular moiety which has a visible color, or which is capable of attaining a desired visible color upon polymerization with the linker molecule.

At least one charged particle 10 may be encapsulated along with a suspension fluid 12 within at least one microcapsule 14. Alternatively, a plurality of the microparticles 10 may be present in each microcapsule 14. The suspension fluid 12 may be a dielectric solvent having a density which is approximately the same as the density of the microparticles 10. The solvent or solvent mixture in the suspension fluid 12 in which the pigment particles are dispersed may have a low viscosity and a dielectric constant in the range of about 2 to about 30, such as about 2 to about 15 for high particle mobility.

The solvent or solvents of suspension fluid 12 may be linear or branched hydrocarbon oil, halogenated hydrocarbon oil, silicone oil, water, decane epoxide, dodecane epoxide, cyclohexyl vinyl ether, naphthalene, tetrafluorodibromoethylene, tetrachloroethylene, trifluorochloroethylene, 1,2,4-trichlorobenzene, carbon tetrachloride, decane, dodecane, tetradecane, xylene, toluene, hexane, cyclohexane, benzene, an aliphatic hydrocarbon, naphtha, octamethyl cyclosiloxane, cyclic siloxanes, poly(methyl phenyl siloxane), hexamethyldisiloxane, polydimethylsiloxane, poly(chlorotrifluoroethylene) polymer, or combinations of any two or more of these.

Some additional examples of suitable dielectric solvents may include hydrocarbons such as isopar, decahydronaphthalene (DECALIN), 5-ethylidene-2-norbornene, fatty oils, paraffin oil; silicon fluids; aromatic hydrocarbons such as phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-Corning (DC-200). The solvent or solvent mixture may be visibly transparent, and, in addition, the solvent may be visibly colorless, or, alternatively, may be colored by a dye or pigment.

The microcapsules 14 may be formed of polymers and may be transparent for viewing of the contents therein. Additional types of micro-container units, or display cells, may be used in place of microcapsules 14. Micro-container units, or display cells, may include any type of separation units which may be individually filled with a display fluid. Some additional examples of such micro-container units may include, but are not limited to, micro-cups, micro-channels, other partition-typed display cells and equivalents thereof.

In an embodiment, the microcapsules 14 may be disposed adjacent at least a first electrode layer 16 configured for applying a positive or negative charge adjacent a side of the microcapsules. The electrode layer 16 may be a conducting film, and may be flexible to allow for flexible displays. The electrode layer 16 may have a base substrate 13 supporting individual electrodes 15 corresponding to each microcapsule 14.

With a configuration as shown in FIG. 1A, wherein the polymer microparticles 10 have a positive charge, an application of a positive charge to the electrode layer 16 adjacent a microcapsule 14 may repel the microspheres away from the electrode, while an application of a negative charge to the electrode layer adjacent a microcapsule may attract the microspheres to the electrode. In this manner, if the suspension fluid is of a first color, and the charged microparticles 10 are of a second color, the side of the microcapsules 14 (upper side in FIG. 1A) disposed away from the electrode layer 16 will appear to a viewer 20 to have the color of the suspension fluid (right-side microcapsule in FIG. 1A) when the microparticles are attracted to the electrode layer. On the other hand, the upper side of the microcapsules 14 will visually appear to have the color of the microparticles (left-side microcapsule in FIG. 1A) when the microparticles are repelled away from the electrode layer.

In an alternative embodiment, instead of just one electrode layer 16, the display may also have a second electrode layer 16A (shown in outline in FIGS. 1A and 1B) of appropriate conducting material, and spaced apart from, and opposing the first layer. At least one face 17 may be formed as a transparent conducting material which may also act as a substrate material for the individual electrodes 15A which may be disposed on an inner surface of the electrode layer 16A towards the microcapsules 14. The microcapsules 14 may be sandwiched between the electrode layers 16, 16A. Some examples of transparent conducting materials may include, but are not limited to, indium tin oxide (ITO) on polyester, aluminum zinc oxide (AZO), fluorine tin oxide (FTO), poly(3,4-ethylenedioxythiophene) (PEDOT), PEDOT with poly(styrene sulfonate) (PSS), poly(4,4-dioctylcyclopentadithiophene), and carbon nanotubes. A voltage difference may be imposed across the microcapsules 14 wherein one layer may apply a charge which is opposite to the charge of the other layer. In this manner, one side of the arrangement may attract the microparticles 10 while the other side repels the microparticles 10 to better facilitate movement of the microparticles through the suspension fluid 12.

The colors appearing at the surface of face 17 of such electrophoretic displays may be enhanced or promoted by direct sunlight, other external lighting sources, or back-lighting.

As an alternative, as depicted in FIG. 1B, the visible color in a microcapsules 14 may be produced by providing two sets of oppositely charged, and differently colored microparticles 10 in each microcapsule. For example, the positively charged particles may be black and the negatively charged particles may be white (or any other color combinations). Application of electric fields as shown, would attract the black particles to the negatively charged electrodes and the white particles to the positively charged electrodes, and in the depiction of FIG. 1B, the upper surface in the left microcapsule would appear black, and the upper surface in the right microcapsule would appear white.

The pigmented microparticles 10 that are used in electrophoretic displays may be chosen, or configured, based on the desired colors required for the display. Black and white colors may be used, for example, in e-book readers which display a replica of a white page with black type. Alternative, individual colors may also be used, or, to provide color combinations, the microcapsules 14 of an array of microcapsules may individually be filled with different colors in a repeating pattern so that by activating select ones of the microcapsules, individual colors, and color combinations may be achieved. Two common models for obtaining various colors and color combinations include the RYB or red-yellow-blue model which uses the named set of subtractive primary colors, or the RGB or red-green-blue model which uses the named set of additive primary colors.

As an example, in an RYB system, individual microcapsules may be provided containing the individual colored microparticles of red, yellow, or blue, and the microcapsules may be arranged in a repeating array of the three colors. When a red-color is desired to be displayed, a negative charge may be selectively applied to the microcapsules containing the red-colored microparticles, or alternatively, for yellow, a negative charge may be selectively applied to the microcapsules containing the yellow-colored microparticles. To produce orange, however, a negative charge may be selectively applied to the microcapsules containing red-colored particles and microcapsules containing yellow-colored particles, so that the red and yellow combine to produce an orange color. This could be applied to any combination of microcapsules to produce a variety of colors.

As mentioned briefly above, each microparticle 10 may be a charged particle having a polymer of chromophores and charged linker molecules. In an embodiment, the charged particles may be a polymer of chromophores and charged linker molecules. Alternatively, the charged particle may be an alternating copolymer (repeating units, such as . . . A-B-A-B-A-B . . . ) of chromophores and charged linker molecules so that the pigment molecule is covalently bound within the particle. As described in more detail below, by appropriate configuration of the reactants, that is, the chromophores and the charged linker molecules, the microparticles 10 may be produced by a copolymerization reaction between the chromophores and charged linker molecules.

While not being limited to the following, the charged linker molecules may be molecular constituents which have at least one of: a quaternary ammonium constituent, a quaternary phosphonium constituent, a quaternary arsonium constituent, a quaternary stibonium constituent, and a ternary sulfonium constituent. In an embodiment wherein the charged linker molecule is selected from the above group, the resultant polymer will carry a positive charge (cation).

In an embodiment, the charged particle may be a copolyamide, wherein one of the pigment molecules and the charged linker molecule may be a component derived from a diamine moiety and the other of the pigment molecule and the charged linker molecule may be a component derived from a dicarbonyl moiety. With such molecular configurations, the diamine component and the dicarbonyl component may be polymerized by a condensation polymerization reaction. Some examples of dicarbonyls which may be used for copolymerization may include, but are not limited to, dicarboxylic acids, diacyl halides, dianhydrides, diesters, or any combination thereof.

The pigment molecule may be any diamine moiety or dicarbonyl moiety that has a visual color which remains after the copolymerization, or any diamine moiety or dicarbonyl moiety that attains a visual color upon copolymerization. Some examples of colors may include red, yellow, blue, green, black, white, etc., or variations or combinations thereof, such as cyan or magenta, orange, violet, pink, etc.

For producing red-colored charged particles for microparticles 10, a red-colored chromophore, or pigment molecule, may be copolymerized with a charged linker molecule. Alternatively, a pigment molecule may be used which is capable of attaining a red color upon copolymerization with a charged linker molecule. In an embodiment, the pigment molecule may be a dianhydride moiety that is red-colored or capable of being red-colored, and the charged linker molecule may be a quaternary ammonium diamine moiety. Alternatively, the charged linker molecules may also be quaternary phosphonium, quaternary arsonium, quaternary stibonium, and ternary sulfonium cations.

One molecular entity which is capable of being used to produce red-colored pigment molecules is perylene

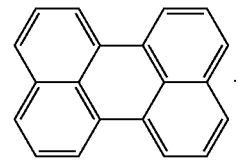 [SMILES: c1cc2cccc3c4cccc5cccc(c(c1)c23)c54]

While perylene itself is brown in color, many derivatives of perylene are red in color. Some examples of perylene derivatives which are red in color, include, but are not limited to, (A) perylene-3,4,9,10-tetracarboxylic dianhydride (Pigment Red 224), (B) 2,9-Bis(4-ethoxyphenyl)anthra[2,1,9-def:6,5,10-d'e'f']diisoquinoline-1,3,8,10(2H,9H)-tetrone (Pigment Red 123), and (C) 2,9-Di(4-methoxyphenyl)-anthra2,1,9-def.6,5,10-d'e'f'diisoquinoline-1,3,8,10-tetrone (Pigment Red 190).

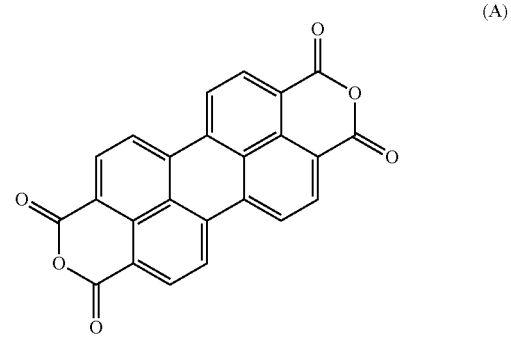

(A)

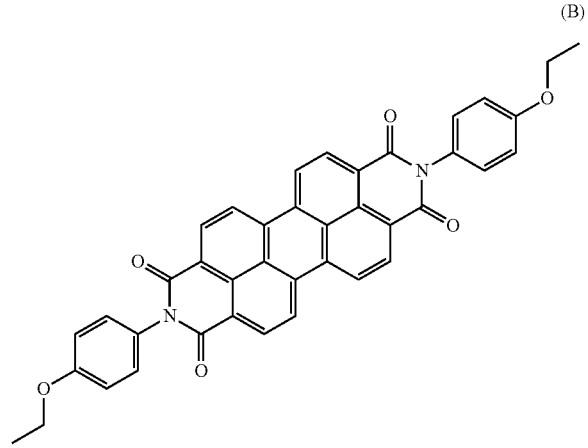

(B)

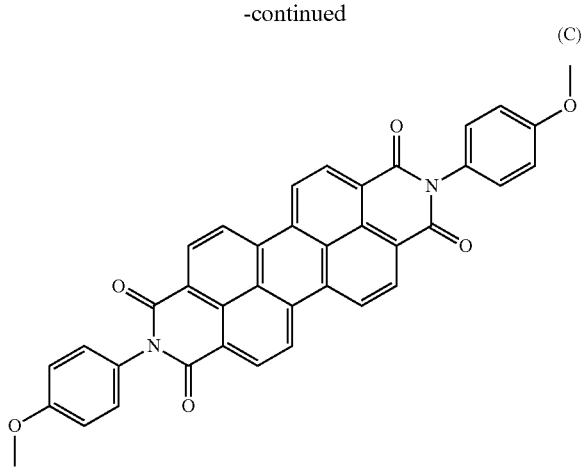

Pigment Red 123 (B) and Pigment Red 190 (C) are perylene diimides incorporating respectively, ethoxyphenyl or methoxyphenyl substituents, and are highly heat stable. Polycationic red pigment particles, in accordance with embodiments, may be produced based on the structures (B) and (C).

In an embodiment, red-colored cationic microparticles may be copolymers of a dianhydride moiety and at least one of: a quaternary ammonium diamine moiety and a quaternary phosphonium diamine moiety. The dianhydride moiety may be perylene-3,4,9,10-tetracarboxylic dianhydride (A), analogs thereof, or derivatives thereof, or any combination of perylene-3,4,9,10-tetracarboxylic dianhydride, its analogs and its derivatives.

In an additional embodiment, red-colored charged particles may be copolymers of a dianhydride moiety and a quaternary diamine moiety wherein the quaternary diamine moiety is a quaternary bis-alkoxyaniline (D), analogs thereof, or derivatives thereof, or any combination of the quaternary bis-alkoxyaniline (D), its analogs, and its derivatives.

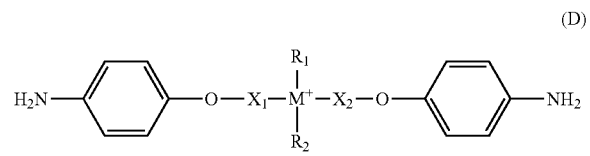

where M is N or P, $R_1$ and $R_2$ are each independently $C_1$ to $C_{10}$ alkyl, and $X_1$ and $X_2$ are each independently $C_2$ to $C_{10}$ alkylene.

In an embodiment, the red-colored charged particles may be a copolymer (E) where M is N or P, $R_1$ and $R_2$ are each independently $C_1$ to $C_{10}$ alkyl, and $X_1$ and $X_2$ are each independently $C_2$ to $C_{10}$ alkylene.

Figure 2:
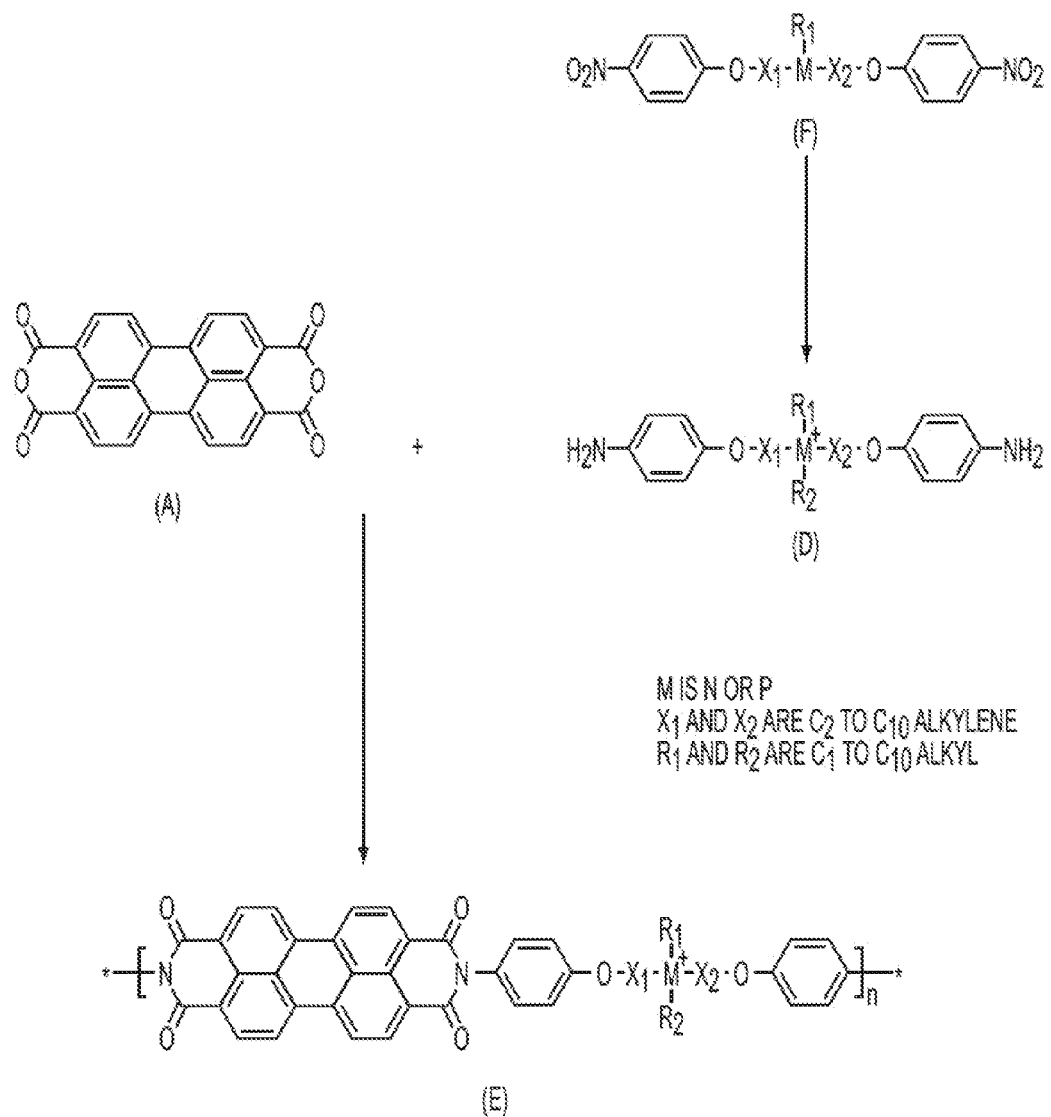
FIG. 2 depicts an illustrative method of producing red-colored microparticles according to an embodiment.

As represented in FIG. 2, the red-colored copolymer (E) may be produced by a polycondensation of perylene-3,4,9,10-tetracarboxylic dianhydride (A) and a quaternary bis-alkoxyaniline (D). The quaternary bis-alkoxyaniline (D) may be produced from a dinitroaryl amine component (F). The dinitroaryl amine component (F) may be alkylated by treatment with an alkyl iodide in acetonitrile to produces a quaternary salt. The nitro groups may be reduced by treatment of the quaternary salt with hydrogen gas and palladium on carbon in methanol to provide the quaternary bis-alkoxyaniline (D). Polycondensation may be performed by heating a mixture of the perylene dianhydride (A) and the dianiline (D) in a suitable solvent for a period of time, and at a temperature sufficient for polymerization to occur. In an embodiment, the mixture may be heated to about 150° C. to about 200° C. for about 1 to about 2 days to produce the polyimide (E). Some examples of solvents which may be used include, but are not limited to, butanol, quinolone, toluene, xylene, or propionic acid. If a non-acidic solvent is used, the polymerization reaction may be promoted by addition of a base such as triethylamine or pyridine.

Other commercially available dianhydrides or diamines may be substituted for a portion of the dianhydride (A) or diamine (D), respectively, and may be polymerized into the polymer in the polycondensation reaction to alter the physicochemical properties of the resulting polyimides (E) and provide variations in the particle and optical properties as may be desired depending on the usage. Some examples of substitute dianhydrides may include, but are not limited to, pyromellitic dianhydride, bismaleimide, biphenyl tetracarboxylic dianhydride and benzophenone tetracarboxylic dianhydride. Dicarboxylic acids such as adipic acid may be used in place of dianhydrides. Some examples of substitute diamines may include simple diamines, such as, ethylenediamine, 1,3-diaminopropane or 1,2-diaminopropane 1,4-diaminobutane, and 1,6-diaminohexane.

For producing blue-colored charged particles for microparticles 10, a blue-colored chromophore, or pigment molecule, may be polymerized with a charged linker molecule. Alternatively, a pigment molecule may be used which is capable of attaining a blue color upon polymerization with a charged linker molecule. The polymerization may be a condensation polymerization to copolymerize chromophores and charged linker molecules.

In an embodiment of blue-colored cationic microparticles, the pigment molecule may be a blue-colored dicarbonyl moiety and the charged linker molecule may be a quaternary diamine moiety. In an alternative embodiment, the pigment molecule may be a blue-colored diamine moiety and the charged linker molecule may be a quaternary dicarbonyl moiety. As mentioned above, the charged linker molecules may be quaternary ammonium, quaternary phosphonium,

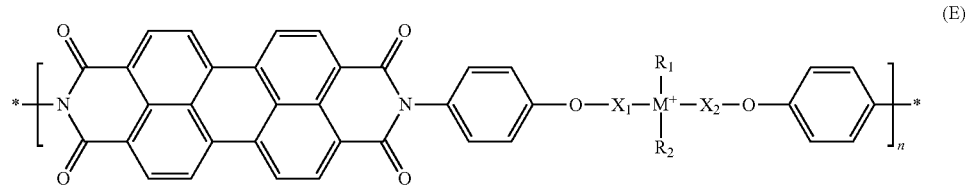

quaternary arsonium, quaternary stibonium, and ternary sulfonium cations. In an embodiment, the charged linker molecule may be at least one of a quaternary ammonium substituent and a quaternary phosphonium substituent. The dicarbonyl moiety may be at least one of a dicarboxylic acid, a diacyl halide, a dianhydride, a diester, or a combination thereof.

One molecular entity which is capable of being used to produce blue-colored pigment molecules is anthraquinone (G)

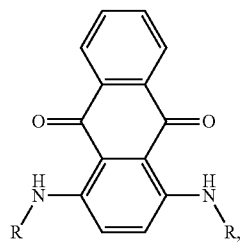

(G)

wherein R is an alkyl. Two examples of blue pigment molecules based on structural component (G) include Solvent Blue 35 (Oil Blue 35, Sudan Blue II) wherein R is n-butyl, or Solvent Blue 14 (Oil Blue N) wherein R is n-pentyl. Distal modifications of the side-chain alkyl groups R may negligibly affect the anthraquinone chromophore.

In one embodiment, the blue-colored chromophore may be a component derived from a dicarbonyl moiety and the charged linker molecule may be a component derived from at least one of a quaternary ammonium diamine moiety and a quaternary phosphonium diamine moiety. The dicarbonyl moiety may be at least one of: component (H)

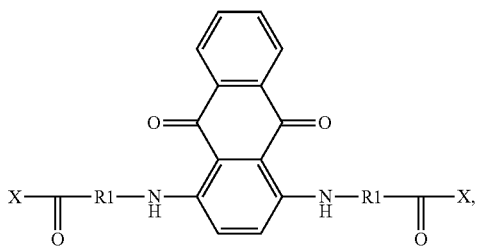

(H)

analogs thereof, and derivatives thereof, wherein each $R_1$ may be the same or different ones of $C_1$ to $C_{10}$ alkylene and X is one of —OH or —O-succinimide At least one of the quaternary diamine moieties may be at least one of: component (I)

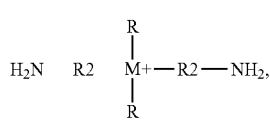

(I)

analogs thereof, and derivatives thereof, where M is N or P, each R is the same or different ones of $C_1$ to $C_{10}$ alkyl, and each $R_2$ is the same or different ones of $C_2$ to $C_{10}$ alkylene.

In an embodiment, the particles may be blue-colored cationic copolymers (J) having the structure:

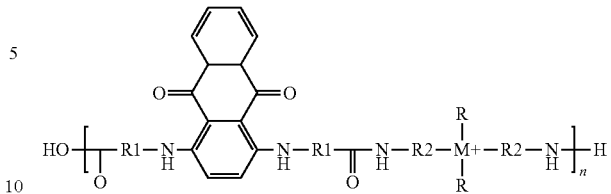

(J)

where M is N or P, each R is the same or different ones of $C_1$ to $C_{10}$ alkyl, each $R_1$ is the same or different ones of $C_1$ to $C_{10}$ alkylene, and each $R_2$ is the same or different ones of $C_2$ to $C_{10}$ alkylene.

In an embodiment, the chromophore may be a component derived from a diamine moiety and the charged linker molecule may be a component derived from at least one of a quaternary ammonium dicarbonyl moiety and a quaternary phosphonium dicarbonyl moiety. The diamine moiety may be at least one of: component (K)

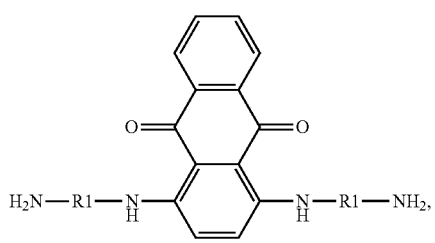

(K)

analogs thereof, and derivatives thereof, where each $R_1$ is the same or different ones of $C_1$ to $C_{10}$ alkylene. At least one of the quaternary dicarbonyl moieties may be at least one of: component (L)

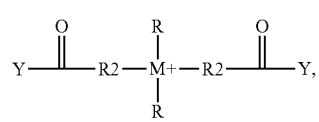

(L)

analogs thereof, and derivatives thereof, where M is N or P, each R is the same or different ones of $C_1$ to $C_{10}$ alkyl, and each $R_2$ is the same or different ones of $C_2$ to $C_{10}$ alkylene, and Y is one of —OH or —O-succinimide.

In an embodiment, the particles may be blue-colored cationic copolymers (M) having the structure:

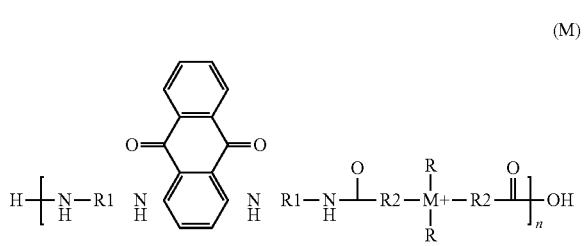

(M)

where M is N or P, each R is the same or a different $C_1$ to $C_{10}$ alkyl, each $R_1$ is the same or a different $C_1$ to $C_{10}$ alkylene, and each $R_2$ is the same or a different $C_2$ to $C_{10}$ alkylene.

Figure 3A:
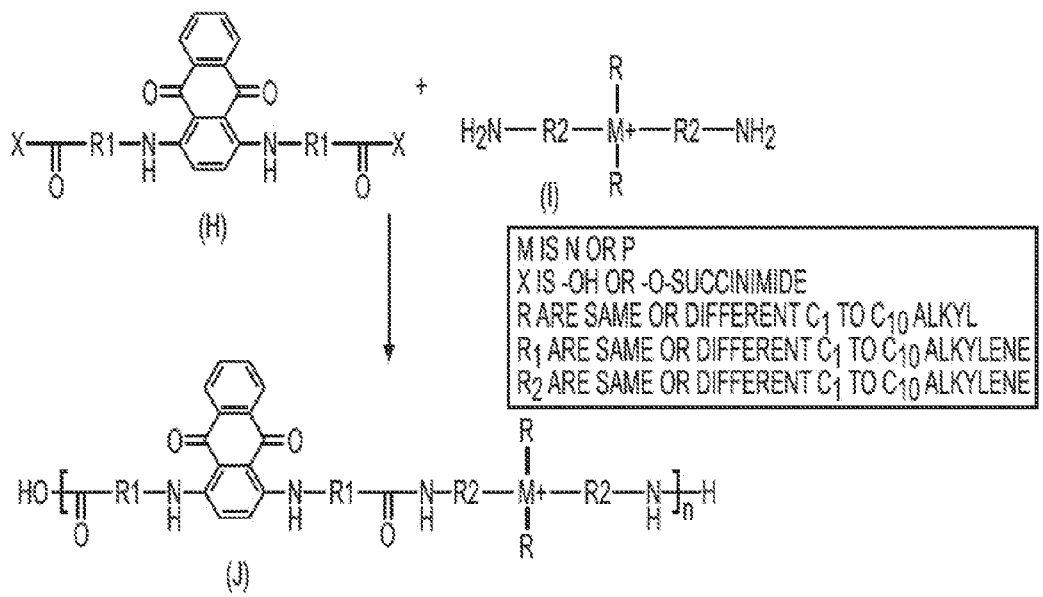
FIGS. 3A and 3B show illustrative methods of producing blue-colored microparticles according to an embodiment.
Figure 3B:
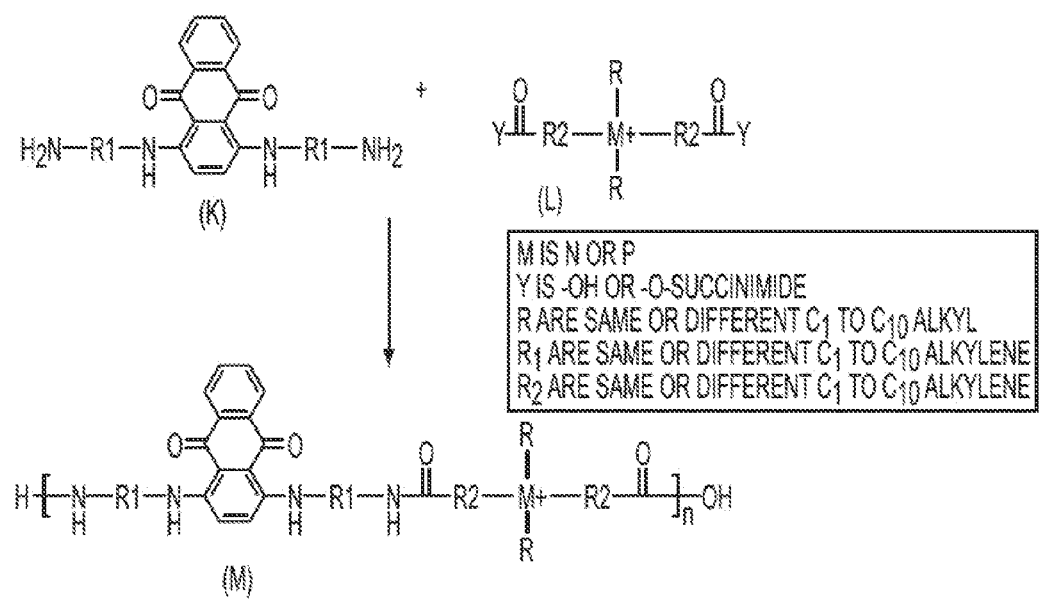

FIGS. 3A and 3B, show a representative method for producing the blue-colored copolymers (J) and (M) by polycondensation. Anthraquinone monomers (H) and (K) may be synthesized from their respective blue anthraquinones. Respective co-monomers for producing the copolymers (J) and (M) may be quaternary dicarboxylates (L) and quaternary diamines (I). A diacid (L) wherein Y is —OH, may be produced by synthesizing a diester of the quaternary component represented by (L), and subjecting the diester to an ester hydrolysis in a mixture of aqueous hydroxide and methanol.

The production of polyamides from di-carboxylic acid and diamine monomers typically employs polycondensation at high reaction temperatures (~200° C.). However, to reduce or avoid possible degradation of the anthraquinone moiety at the high temperatures, a lower temperature may be used by first converting carboxylic acids to succinimide esters. For anthraquinone monomers (H) wherein X is —OH, and diacids (L) wherein Y is —OH, the acids may first be converted to bis-N-hydroxysuccinimide (NHS) esters wherein the X and the Y are —O-succinimide Bis-NHS-esters may be synthesized from di-carboxylates (X and Y are —OH) upon treatment of the di-carboxylates with a carbodiimide such as dicyclohexylcarbodiimide and N-hydroxysuccinimide in a dry inert solvent such as dioxane. Filtration of the dicyclohexyl urea byproduct, addition of a dry non-polar solvent such as toluene or heptane to the filtrate, and filtration of the precipitate will yield the respective bis-NHS-esters (X and Y are —O-succinimide.

The succinimide esters of (H) and (L) may then be used as the di-carboxylate monomer components in polycondensation with diamines (I) and (K), respectively, at lower temperatures that may be less than about 100° C. Lower temperature polycondensation reactions may be conducted by placing a mixture of either the succinimide esters of (H) and the diamine (I) or alternatively, a mixture of the succinimide esters of (L) and the diamine (K) in a dry polar aprotic solvent such as dimethyl sulfoxide (DMSO) or N-methylpyrrolidinone (NMP). The mixture may be stirred at room temperature (about 20° C.), or possibly heated to about 60° C., and allowed to polymerize for about 24 to about 48 hours. Treatment with ice cold water followed by filtration of the precipitate will yield blue polycationic anthraquinone pigments (J) and (M), respectively.

To optimize the physicochemical and optical properties of the polycationic pigment particles produced, at least a portion of the NHS-esters of the diacids may be replaced with NHS-esters of simple dicarboxylic acids such as adipic acid, and/or at least a portion of the diamines may be replaced with simple diamines such as 1,6-diaminohexane in the above-discussed polycondensation reaction.

For producing yellow-colored charged particles for microparticles 10, a yellow-colored pigment molecule, or chromophore, may be polymerized with a charged linker molecule. Alternatively, a pigment molecule may be used which is capable of attaining a yellow color upon polymerization with a charged linker molecule. The polymerization may be a condensation polymerization to copolymerize chromophores and charged linker molecules.

In an embodiment for yellow-colored cationic microparticles, the pigment molecule may be a yellow-colored dicarbonyl moiety and the charged linker molecule may be a quaternary diamine moiety. In an alternative embodiment, the pigment molecule may be a yellow-colored diamine moiety and the charged linker molecule may be a quaternary dicarbonyl moiety. As mentioned above, the charged linker molecules may be quaternary ammonium, quaternary phosphonium, quaternary arsonium, quaternary stibonium, and ternary sulfonium cations. In an embodiment, the charged linker molecule may be at least one of a quaternary ammonium substituent and a quaternary phosphonium substituent. The dicarbonyl moiety may be one of a dicarboxylic acid, a diacyl halide, a dianhydride, a diester, or a combination thereof.

Arylides are a large class of azo pigments that include many yellow components having high tinctorial strength with utility as printer inks. This group includes molecular component (N)

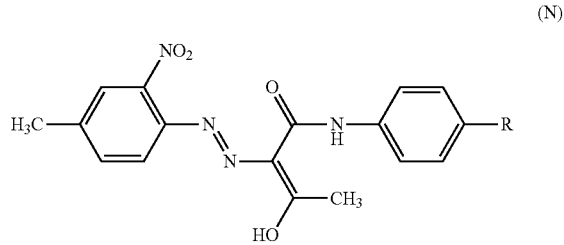

wherein R is H (Pigment Yellow 1), or alkyl.

In one embodiment of yellow-colored microparticles, the chromophore may be a component derived from a dicarbonyl moiety and the charged linker molecule may be a component derived from at least one of a quaternary ammonium diamine moiety and a quaternary phosphonium diamine moiety. The dicarbonyl moiety may be at least one of: component (O)

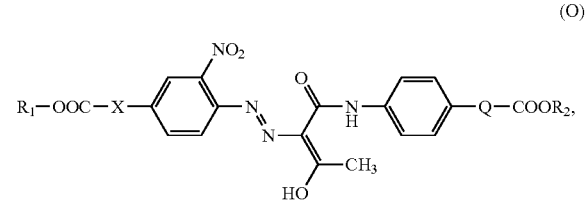

analogs thereof, and derivatives thereof, where $R_1$ and $R_2$ are one of —H and -succinimide, and X and Q are independently $C_1$ to $C_{10}$ alkylene. At least one of the quaternary diamine moiety may be at least one of: component (P)

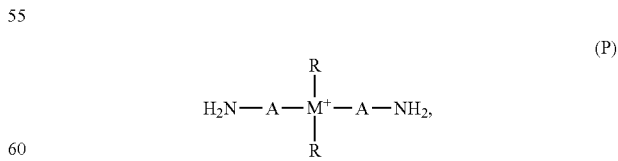

analogs thereof, and derivatives thereof, where M is N or P, each R is the same or a different one of $C_1$ to $C_{10}$ alkyl, and each A is the same or a different one of $C_1$ to $C_{10}$ alkylene.

In an embodiment, the particles may be yellow-colored cationic copolymers (Q) having the structure:

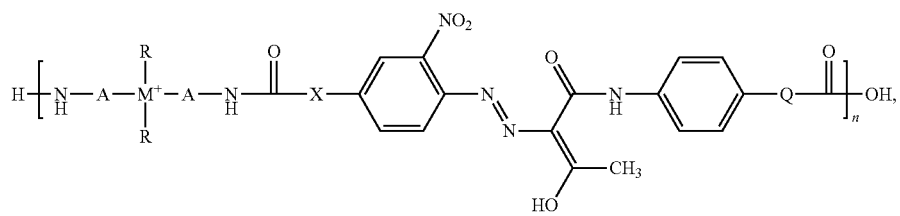

(Q)

where M is N or P, each R is the same or a different one of $C_1$ to $C_{10}$ alkyl, and A, X and Q are independently $C_1$ to $C_{10}$ alkylene.

Figure 4A:
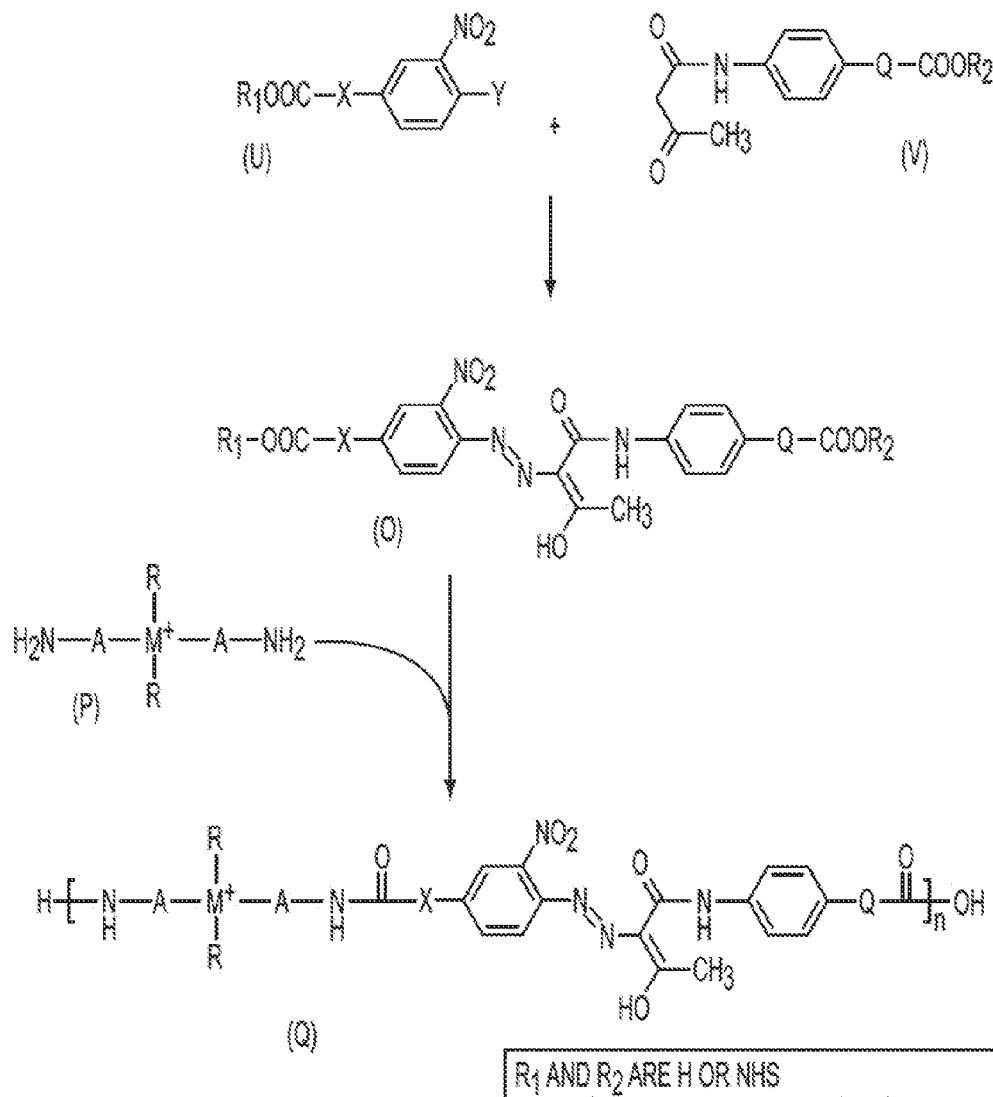
FIGS. 4A and 4B show illustrative methods of producing yellow-colored microparticles according to an embodiment.

Yellow-colored copolymers (Q) may be produced by a method as represented in FIG. 4A. An amino-nitro-phenyl carboxylic acid (U) with Y=$NH_2$, such as amino-nitro-phenylacetic acid with X=$CH_2$, may be treated with aqueous nitrous acid to yield a diazonium salt wherein Y=$N_2^+$. An acetoacetamide (V) may be synthesized from an amino phenyl carboxylic acid by treatment with diketene in a suitable solvent such as water. For example, an acetoacetamide wherein Q=$CH_2CH_2$, may be synthesized from 3-(4-aminophenyl)propionic acid. An ice cold mixture of the acetoacetamide (V) and water may be treated with diazonium component (U) and maintained at about pH 5 by dropwise addition of about 40% aqueous sodium hydroxide and stirring for about 3-4 hours. The solid may be filtered, washed with water and dried under reduced pressure to provide the yellow dicarboxy azo-arylide pigment (O) wherein $R_1$ and $R_2$ are H.

The production of polyamides from di-carboxylic acid and diamine monomers typically is done by polycondensation at high reaction temperatures (about 200° C.). To avoid possible degradation of the azo-arylide monomer during polycondensation, the dicarboxylic acid (O) wherein $R_1$ and $R_2$ are H may be converted into a diester wherein $R_1$ and $R_2$ are N-hydroxysuccinimide (NHS). The bis-NHS ester may be synthesized from the dicarboxylic acid upon treatment of the dicarboxylic acid with N-hydroxysuccinimide and a carbodiimide such as dicyclohexylcarbodiimide in a dry inert solvent such as dioxane, filtration of the dicyclohexyl urea byproduct, addition of a dry non-polar solvent such as toluene or heptane to the filtrate, and filtration of the precipitate. The use of the bis-N-hydroxysuccinimide (NHS) ester as the di-carboxylate monomer components allows for lower temperature polycondensation reactions (less than about 100° C.) with the diamines.

A mixture of diamine (P) and dicarboxylate (O) in a dry polar aprotic solvent, such as DMSO or N-methylpyrrolidinone (NMP), may be stirred for about 24 to about 48 hours at room temperature (which may be about 20° C.) or alternatively heated at about 60° C. Treatment with ice cold water followed by filtration of the precipitate yields the yellow polycationic azo-arylide pigment (Q).

To optimize the physicochemical and optical properties of the polycationic pigment particles produced, at least a portion of the NHS-esters of the diacids may be replaced with NHS-esters of simple dicarboxylic acids such as adipic acid, and/or at least a portion of the diamines may be replaced with simple diamines such as 1,6-diaminohexane in the above-discussed polycondensation reaction.

For alternative embodiments for yellow microparticles, the chromophore may be a component derived from a yellow-colored diamine moiety and the charged linker molecule may be a component derived from at least one of a quaternary ammonium dicarbonyl moiety and a quaternary phosphonium dicarbonyl moiety. The diamine moiety may be at least one of: component (R)

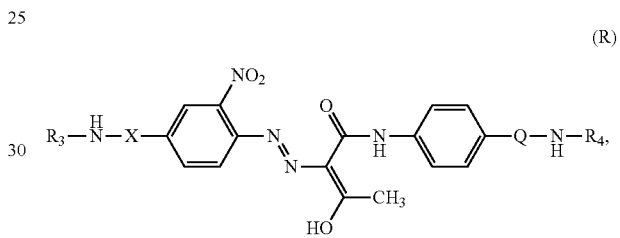

(R)

analogs thereof, and derivatives thereof, where $R_3$ is —H or Fmoc, $R_4$ is —H or boc and X and Q are independently $C_1$ to $C_{10}$ alkylene. The quaternary dicarbonyl moiety may be at least one of: component (S)

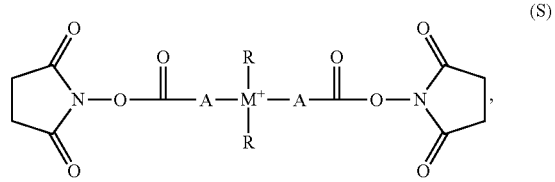

(S)

analogs thereof, and derivatives thereof, where M is N or P, each R is the same or a different $C_1$ to $C_{10}$ alkyl and each A is the same or a different $C_1$ to $C_{10}$ alkylene.

In an embodiment, the particles may be yellow-colored cationic copolymers (T) having the structure

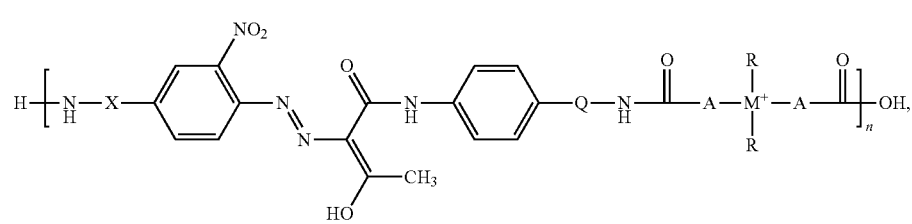

(T)

where M is N or P, each R is the same or a different $C_1$ to $C_{10}$ alkyl, each A is the same or a different $C_1$ to $C_{10}$ alkylene, and X and Q are independently $C_1$ to $C_{10}$ alkylene.

Figure 4B:
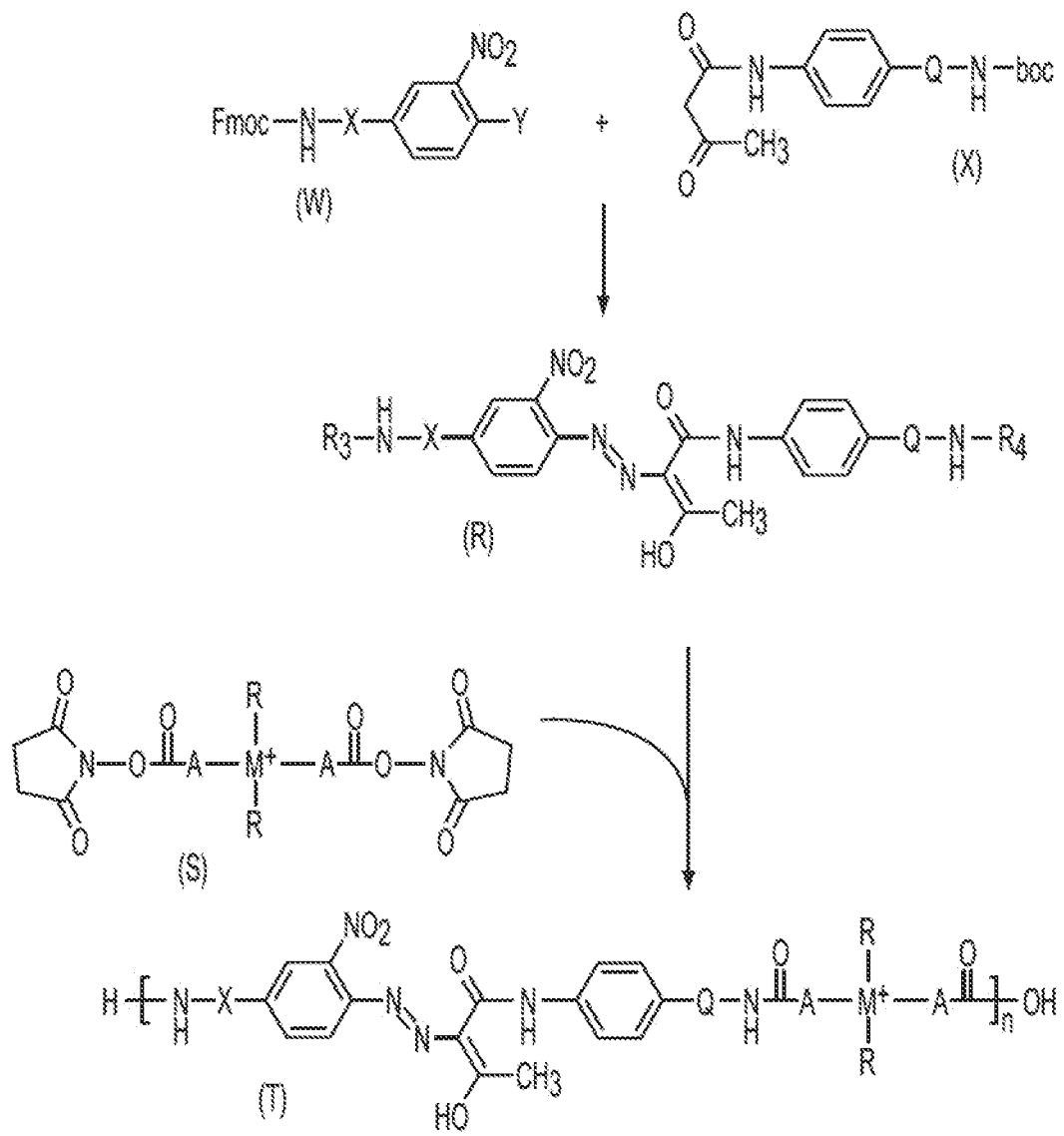

Comparable methods to those described above for microparticles (Q) may be applied to production of yellow-colored microparticles (T). As shown in FIG. 4B, amines (W) and (X), protected by either a Boc group (tert-butyloxycarbonyl), or Fmoc group (fluorenylmethyloxycarbonyl), may be combined to form the yellow pigment component (R). An amino nitro aniline (such as 4-(2-aminoethyl)-2-nitroaniline) may be Fmoc-protected to provide the component (W) wherein Y=$NH_2$. This component may then be converted without deblocking of the Fmoc protecting group, by aqueous nitrous acid mediated synthesis, to a diazonium salt wherein Y=$N_2^+$. A Boc-protected acetoacetamide (X) may be synthesized from a 4-(2-aminoalkyl) aniline (such as 4-(2-aminoethyl)aniline) by mono-Boc-protection followed by treatment with diketene in a suitable solvent, such as water. An ice cold mixture of the acetoacetamide (X) and water may be treated with diazonium component (W) and maintained at about pH 5 by dropwise addition of about 40% aqueous sodium hydroxide and stirring for about 3-4 hours. The solid may be filtered, washed with water and dried under reduced pressure to provide the pigment molecules (R) where $R_3$ and $R_4$ are both still protected by Fmoc and boc respectively. The pigment molecules (R) may be Boc-deprotected with trifluoroacetic acid and then Fmoc-deprotected with piperidine to produce yellow diamino azo-arylide (R) wherein $R_3$ and $R_4$ are both H.

Quaternary di-NHS-ester (S) may be synthesized from a quaternary dicarboxylate ester after ester hydrolysis using a mixture of aqueous hydroxide and methanol. A mixture of diamine (R) and dicarboxylate (S) in a dry polar aprotic solvent, such as DMSO or N-methylpyrrolidinone (NMP), may be stirred for about 24 to about 48 hours at room temperature (which may be about 20° C.) or alternatively heated at about 60° C. Treatment with ice cold water followed by filtration of the precipitate yields the yellow polycationic azo-arylide pigment (T).

Charged pigment particles, such as, for example, any of the embodiments as discussed above, may be produced and marketed in a final polymeric form, or alternatively, the components for producing the particles could be sold in kit form to allow an end user to produce the particles on site, for example, and possibly on an 'as-needed' basis. Such a kit may be for producing one color of microparticle and may include the needed chromophores for producing a certain color, as well as the charged linker molecules for being copolymerized with the chromophores to form the charged pigment particles. Alternatively, such a kit may be for producing microparticles of one color as well as microparticles of another color, or any combinations of colored microparticles.

Such a kit may, for example, have chromophores which are of a diamine moiety and charged linking molecules which are of a dicarbonyl moiety, or alternatively, chromophores which are of a dicarbonyl moiety and charged linking molecules which are of a diamine moiety. For either the chromophores, or the charged linking molecules, the dicarbonyl moiety may be at least one of a dicarboxylic acid, a diacyl halide, a dianhydride, a diester, a dialdehyde, a diketone or a combination thereof. The charged linking molecule may be cations selected from the group consisting of quaternary ammonium, quaternary phosphonium, quaternary arsonium, quaternary stibonium, and ternary sulfonium cations.

For red-colored particles, the kit may include dianhydride moieties of at least one of component (A), analogs thereof, and derivatives thereof, and quaternary diamine moieties of at least one of component (D), analogs thereof, and derivatives thereof, where M is N or P, R is $C_1$ to $C_{10}$ alkyl, and X is $C_2$ to $C_{10}$ alkylene.

For yellow-colored particles, the kit may include at least one of Option 1 and Option 2. For Option 1, the kit may include dicarbonyl moieties of at least one of component (O), analogs thereof, and derivatives thereof, where $R_1$ and $R_2$ are one of —H and -succinimide, and X and Q are $C_1$ to $C_{10}$ alkylene; and quaternary diamine moieties of at least one of component (P), analogs thereof, and derivatives thereof, where M is N or P, R is $C_1$ to $C_{10}$ alkyl, and A is $C_1$ to $C_{10}$ alkylene. For Option 2, the kit may include diamine moieties of at least one of component (R), analogs thereof, and derivatives thereof, wherein $R_3$ and $R_4$ are —H, and X and Q are $C_1$ to $C_{10}$ alkylene; and quaternary dicarbonyl moieties of at least one of component (S), analogs thereof, and derivatives thereof, where M is N or P, R is $C_1$ to $C_{10}$ alkyl and A is $C_1$ to $C_{10}$ alkylene.

For blue-colored particles, the kit may include at least one of Option 1 and Option 2. For Option 1, the kit may include dicarbonyl moieties of at least one of component (H), analogs thereof, and derivatives thereof, where $R_1$ is $C_1$ to $C_{10}$ alkylene and X is one of —OH or —O-succinimide; and quaternary diamine moieties of at least one of component (I), analogs thereof, and derivatives thereof, where M is N or P, R is $C_1$ to $C_{10}$ alkyl, and $R_2$ is $C_2$ to $C_{10}$ alkylene. For Option 2, the kit may include diamine moieties of at least one of component (K), analogs thereof, and derivatives thereof, where $R_1$ is $C_1$ to $C_{10}$ alkylene; and quaternary dicarbonyl moieties of at least one of component (L), analogs thereof, and derivatives thereof, where M is N or P, R is $C_1$ to $C_{10}$ alkyl, and $R_2$ is $C_2$ to $C_{10}$ alkylene, and Y is one of —OH or —O-succinimide.

In alternative embodiments, the kit may include any combination of, or all of the components for producing any combination of, or all of the red-colored microparticles, the blue-colored microparticles, or the yellow-colored microparticles.

EXAMPLES

Example 1: Red-Colored Charged Microparticles

Red-colored copolymer (E) is produced by a polycondensation of perylene-3,4,9,10-tetracarboxylic dianhydride (A) and quaternary ammonium salt (D) wherein M=N, $X_1$ and $X_2$=$CH_2CH_2$ and $R_1$ and $R_2$=$CH_3$ (synthesized according to the method described in Telepova, N D, Ginzburg, O F. (1969) Synthesis and some properties of methylbis(2-aryloxyethyl)amines. Zh Org Khim 5, 1429-1432).

A mixture of the perylene dianhydride (A) and an N,N-dimethylbis(2-(4-aminophenoxy)ethyl)ammonium salt (D) in about a 1:1 molar ratio in toluene is stirred while heating at 200° C. for 48 hours to produce red-colored cationic polyimide (E) wherein M=N, $X_1$ and $X_2$=$CH_2CH_2$ and $R_1$ and $R_2$=$CH_3$. The microparticles (E) are filtered from the mixture and washed with toluene.

Example 2: Blue-Colored Charged Microparticles

Blue-colored copolymer (J) is produced by a polycondensation of an anthraquinone dicarboxylic acid derivative (H) wherein $R_1$ is $CH_2CH_2$ and X is —O-succinimide, and a quaternary ammonium diamine (I) wherein M is N, R is $CH_3$ and $R_2$ is $CH_2CH_2$ (synthesized according to the method described in Zhao, Y, et al. (2009) Synthesis, cytotoxicity and cucurbituril binding of triamine linked dinuclear platinum complexes. Dalton Trans 5190-5198).

A mixture of dicarboxylic acid (H) wherein X is OH (synthesized according to the method described in Stapleton, I W. (1978) Dyestuffs containing isothiouranium groups. Brit Pat GB1508238) (1 equivalent), N-hydroxysuccinimide (2.1 equivalents), dicyclohexylcarbodiimide (2.1 equivalents) and dry dioxane is stirred at about 20° C. for 24 hours. The dicyclohexylurea byproduct is removed by filtration, and dry toluene is added to the filtrate. The solid bis-NHS ester (H) wherein X=—O-succinimide is filtered from solution.

A mixture of bis-NHS ester (H) and the diamine (I) at about a 1:1 molar ratio in dry DMSO is stirred at 60° C., for 24 hours. The mixture is stirred while treating with ice cold water to precipitate blue polycationic anthraquinone microparticles (J) wherein R is $CH_3$, $R_1$ and $R_2$ is $CH_2CH_2$, and M is N. The microparticles are filtered from solution and washed with ice cold water.

Example 3: Second Configuration of Blue-Colored Charged Microparticles

Blue-colored copolymer (M) is produced by a polycondensation of an anthraquinone diamine (K) wherein $R_1$ is $CH_2CH_2CH_2$ (synthesized according to the method described in Barasch, D, et al. (1999) Novel anthraquinone derivatives with redox-active functional groups capable of producing free radicals by metabolism: are free radicals essential for cytotoxicity? Eur J Med Chem 34, 597-615) and a quaternary ammonium dicarboxylate (L) wherein Y is —O-succinimide, M is N, R is $CH_3$, and $R_2$ is $CH_2CH_2$.

Diethylester (L) wherein Y is $CH_2CH_3$ (synthesized according to the method described in Craig, L E, Tarbell, D S. (1949) Curariform activity and chemical structure. IV. Synthesis in the piperidine series. J Amer Chem Soc 71, 465-467) is stirred with a solution of 10% aqueous sodium hydroxide and methanol for 1 hour and then adjusted to pH 3 by addition of 10% hydrochloric acid. Solvent evaporation yields dicarboxylic acid (L) wherein Y is OH.

A mixture of dicarboxylic acid (L) (1 equivalent), N-hydroxysuccinimide (2.1.equivalents), dicyclohexylcarbodiimide (2.1 equivalents) and dry dioxane is stirred at 20° C. for 24 hours. The dicyclohexylurea byproduct is removed by filtration and dry toluene is added to the filtrate. The solid bis-NHS ester (L) wherein Y=—O-succinimide, is filtered from solution.

A mixture of bis-NBS ester of (L) and diamine (K) at about a 1:1 molar ratio in dry DMSO is stirred at 60° C. for 24 hours. The mixture is stirred while treating with ice cold water to precipitate blue polycationic anthraquinone microparticles (M) wherein R is $CH_3$, $R_1$ and $R_2$ are $CH_2CH_2$, and M is N. The microparticles are filtered from solution and washed with ice cold water.

Example 4: Yellow-Colored Charged Microparticles

Yellow-colored copolymer (Q) is produced by a polycondensation of a bis-NHS ester azo-arylide pigment (O) wherein $R_1$ and $R_2$ are -succinimide, and X and Q are $CH_2CH_2$ and a quaternary ammonium diamine (P) wherein M is N, R is $CH_3$ and A is $CH_2CH_2$ (P is identical to I above).

3-(4-Aminophenyl)propionic acid (synthesized according to the method described in Smith, C R, et al. Triazolopyridazine protein kinase modulators. US Pat Appl 2010/0120739) (1 equivalent) is dissolved in a minimum volume of 5% aqueous sodium hydroxide (pH 8-10) and cooled in an ice bath. Diketene (3 equivalents) is added and the mixture is stirred for 1 hour. Evaporation of the solvent yields acetoacetamide (V) wherein $R_2$ is H, and Q is $CH_2CH_2$.

A mixture of 2-(4-amino-3-nitrophenyl)acetic acid (1 equivalent) and 4% hydrochloric acid is cooled in an ice bath, treated with aqueous sodium nitrite solution (1.2 equivalents), and stirred for 1 hour. Unreacted nitrous acid is quenched by addition of sulfamic acid to yield an acidic aqueous solution of diazonium salt (U) wherein X is $CH_2CH_2$, Y is $N_2^+$, and $R_1$ is H that is used directly in the following step.

An ice cold mixture of water and acetoacetamide (V) wherein $R_2$ is H, and Q is $CH_2CH_2$ (1 equivalent) is added slowly to the ice cold acidic aqueous solution of diazonium salt (U) wherein X is $CH_2CH_2$, Y is $N_2^+$, and $R_1$ is H (1 equivalent). The mixture is adjusted to pH about 5 by dropwise addition of 40% aqueous sodium hydroxide solution and then stirred for 3 hours. The solid is filtered, washed with water and dried under reduced pressure to provide the yellow dicarboxylic acid azo-arylide pigment (O) wherein $R_1$ and $R_2$ are H, and X and Q are $CH_2CH_2$.

A mixture of dicarboxylic acid (O) wherein $R_1$ and $R_2$ are H (1 equivalent), N-hydroxysuccinimide (2.1.equivalents), dicyclohexylcarbodiimide (2.1 equivalents) and dry dioxane is stirred at 20° C. for 24 hours. The dicyclohexylurea byproduct is removed by filtration and dry toluene is added to the filtrate. The solid bis-NHS ester (O) wherein $R_1$ and $R_2$=succinimide, is filtered from solution.

A mixture of diamine (P) and bis-NHS ester (O) at about a 1:1 molar ratio in dry DMSO is stirred at 60° C. for 24 hours. The mixture is treated with ice cold water to precipitate yellow polycationic azo-arylide pigment microparticles (Q) wherein M is N, R is $CH_3$, and A, X and Q are $CH_2CH_2$. The microparticles are filtered from solution and washed with ice cold water.

Example 5: A Second Configuration of Yellow-Colored Charged Microparticles

Yellow-colored copolymer (T) is produced by a polycondensation of diamino-azo-arylide pigment (R) wherein $R_3$ is H, and X and Q are $CH_2CH_2$ and a quaternary ammonium bis-NHS ester (S) wherein M is N, R is $CH_3$ and A is $CH_2CH_2$ (S is identical to L wherein Y is —O-succinimide above).

Di-t-butyl dicarbonate (1 equivalent) is added dropwise to a stirred mixture of 4-(2-aminoethyl)aniline (1 equivalent), 4% aqueous sodium hydroxide (1.1 equivalent), and tetrahydrofuran. After stirring for 16 hours, the mixture is extracted with ethyl acetate. The extract is dried over sodium sulfate and concentrated to yield 4-(2-(t-butoxycarbonyl) aminoethyl) aniline.

To a solution of 4-(2-(t-butoxycarbonyl)aminoethyl)aniline (1 equivalent) in tetrahydrofuran and water is added 5% aqueous sodium hydroxide dropwise to maintain pH 8-10 and cooled in an ice bath. Diketene (3 equivalents) is added and the mixture is stirred for 1 hour. Evaporation of the solvent yields Boc-protected acetoacetamide (X) wherein Q is $CH_2CH_2$.

A mixture of 4-(2-aminoethyl)-2-nitroaniline (synthesized according to the method described in Buchstaller, H-P, et al. (2011) Design and synthesis of isoquinolines and benzimidazoles as RAF kinase inhibitors. Bioorg Med Chem Lett 21, 2264-2269) (1 equivalent), N-(9-fluorenylmethoxycarbonyloxy)succinimide (1 equivalent), 10% aqueous sodium carbonate solution, and 1,2-dimethoxyethane is stirred for 16 hours. The solid is filtered, the filtrate is evaporated and the residue is dissolved in ethyl acetate. The solution is washed with water and concentrated to yield Fmoc-protected nitroaniline (W) wherein X is $CH_2CH_2$ and Y is $NH_2$.

To an ice cold solution of Fmoc-protected nitroaniline (W) (1 equivalent) and $HBF_4$ (1.5 equivalent) in water is added sodium nitrite (1 equivalent) and stirred for 30 minutes yielding an aqueous solution of Fmoc-protected diazonium salt (W) wherein X is $CH_2CH_2$ and Y is $N_2^+$ that is used directly in the next step.

An ice cold mixture of water and Boc-protected acetoacetamide (X) wherein Q is $CH_2CH_2$ (1 equivalent) is added slowly to the ice cold aqueous solution of Fmoc-protected diazonium salt (W) wherein X is $CH_2CH_2$ and Y is $N_2^+$ (1 equivalent). The mixture is adjusted to pH 5 and then stirred for 3 hours. The solid is filtered, washed with water and dried under reduced pressure to provide the yellow Boc- and Fmoc-protected azo-arylide pigment (R) wherein $R_3$ is Fmoc, $R_4$ is Boc and X and Q are $CH_2CH_2$.

A mixture of the Boc- and Fmoc-protected azo-arylide pigment (R) and 50% trifluoroacetic acid in dichloromethane is stirred for 30 minutes. Evaporation of solvents yields Fmoc-protected azo-arylide pigment (R) wherein $R_3$ is Fmoc, $R_4$ is H, and X and Q are $CH_2CH_2$.

A mixture of Fmoc-protected azo-arylide pigment (R), 1,8-diazobicycloundec-7-ene (0.03 equivalent), 1-octanethiol (10 equivalents) and tetrahydrofuran is stirred for 4 hours. After solvent evaporation diamino azo-arylide pigment (R) wherein both $R_3$ and $R_4$ are H, and X and Q are $CH_2CH_2$ is purified by trituration with diethyl ether.

A mixture of diamine (R) and bis-NHS ester (S) at about a 1:1 molar ratio in dry DMSO is stirred at 60° C. for 24 hours. The mixture is treated with ice cold water to precipitate yellow polycationic azo-arylide pigment microparticles (T) wherein M is N, R is $CH_3$, and A, X and Q are $CH_2CH_2$. The microparticles are filtered from solution and washed with ice cold water.

Example 6: A Kit for Producing Charged Pigmented Microparticles

A kit is configured for producing each of red-colored microparticles, blue-colored microparticles, and yellow-colored microparticles.

For the red-colored microparticles, the kit will include: component (A); and component (D), where M is N, R is $CH_3$, and X is $C_2$ alkylene.

For the yellow-colored microparticles, the kit will include: component (O), where $R_1$ and $R_2$ are -succinimide, and X and Q are $C_2$ alkylene; and component (P), where M is N, R is $CH_3$, and A is $C_2$ alkylene.

For the blue-colored microparticles, the kit will include: component (H), where $R_1$ is $C_2$ alkylene, and X is —O-succinimide; and component (I), where M is N, R is $CH_3$, and $R_2$ is $C_2$ alkylene.

Example 7: An Electrophoretic Medium

An electrophoretic medium for use in electrophoretic displays may include any of the microparticles of Examples 1-5. An electrophoretic medium having about 1 to 30 volume % charged particles for producing a blue color in an electrophoretic display is made by dispersing the blue-colored particles (J) of Example 2 in a hydrocarbon oil.

Example 8: An Electrophoretic Display

The electrophoretic medium of Example 7 is encapsulated within individual urea/melamine/formaldehyde microcapsules of about 50 micrometer diameter. The microcapsules are dispersed between two parallel conductive plates, spaced about 50 micrometers apart, and the plates are connected to electrical circuitry that allows external signals to manipulate the electric charge at different precise points on the plates.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, components, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" or "comprises" or "comprise" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A charged pigment particle comprising an alternating copolymer of a chromophore and a charged linker molecule, wherein the chromophore is selected from the group consisting of:

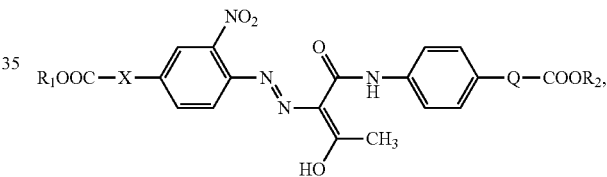

analogs thereof, and derivatives thereof, wherein $R_1$ and $R_2$ are one of —H and -succinimide, and X and Q are each individually a $C_2$ to $C_{10}$ alkylene;

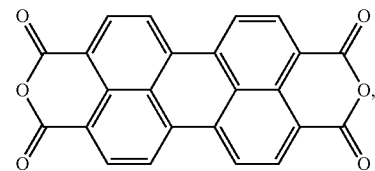

analogs thereof, and derivatives thereof;

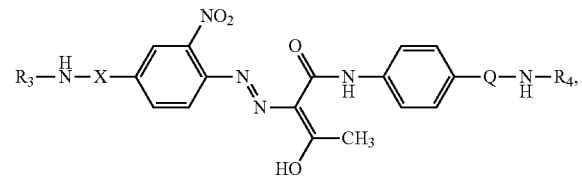

analogs thereof, and derivatives thereof, wherein $R_3$ and $R_4$ are —H, and X and Q are each individually a $C_2$ to $C_{10}$ alkylene;

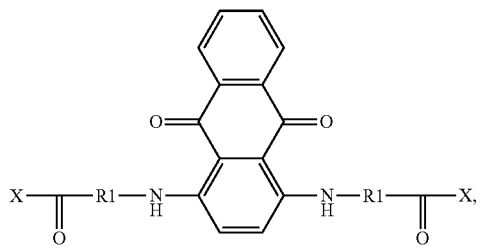

analogs thereof, and derivatives thereof, wherein each $R_1$ is individually a $C_2$ to $C_{10}$ alkylene, and each X is one of —OH or —O-succinimide; and

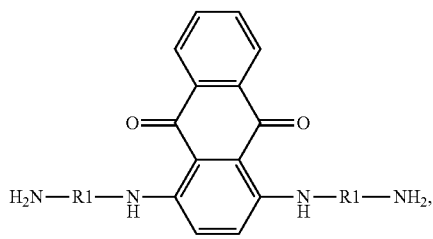

analogs thereof, and derivatives thereof, wherein each $R_1$ is individually a $C_2$ to $C_{10}$ alkylene, and
wherein the charged linker molecule is selected from the group consisting of:

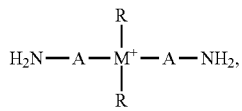

analogs thereof, and derivatives thereof, wherein M is N or P, each R is individually a $C_1$ to $C_{10}$ alkyl, and each A is individually a $C_2$ to $C_{10}$ alkylene;

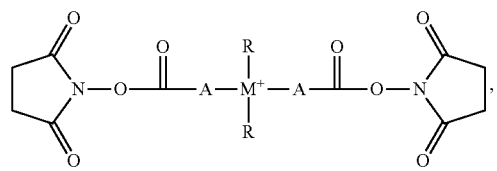

analogs thereof, and derivatives thereof, wherein M is N or P, each R is individually a $C_1$ to $C_{10}$ alkyl, and each A is individually a $C_2$ to $C_{10}$ alkylene;

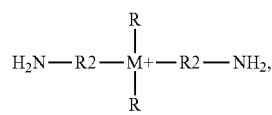

analogs thereof, and derivatives thereof, wherein M is N or P, each R is individually a $C_1$ to $C_{10}$ alkyl, and each $R_2$ is individually a $C_2$ to $C_{10}$ alkylene; and

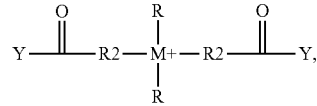

analogs thereof, and derivatives thereof, wherein M is N or P, each R is individually a $C_1$ to $C_{10}$ alkyl, and each $R_2$ is individually a $C_2$ to $C_{10}$ alkylene, and each Y is one of —OH or —O-succinimide.

2. The charged pigment particle of claim 1, wherein the charged pigment particle is a red colored cationic microparticle having the structure:

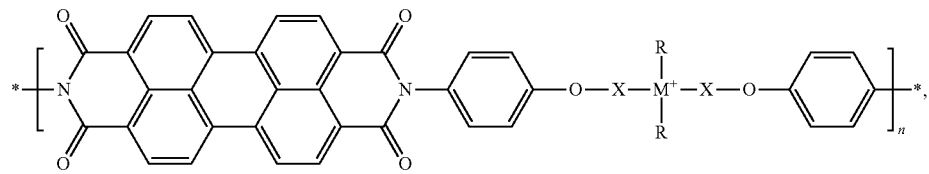

wherein M is N or P, each R is individually a $C_1$ to $C_{10}$ alkyl, and each X is individually a $C_2$ to $C_{10}$ alkylene.

3. The charged pigment particle of claim 1, wherein the charged pigment particle is a blue colored cationic microparticle having the structure:

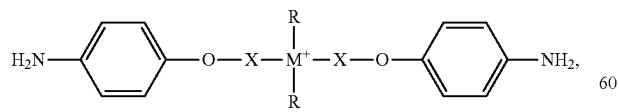

analogs thereof, and derivatives thereof, wherein M is N or P, each R is individually a $C_1$ to $C_{10}$ alkyl, and each X is individually a $C_2$ to $C_{10}$ alkylene;

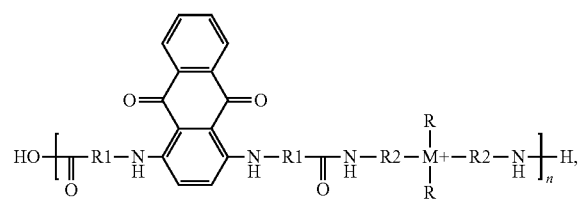

wherein M is N or P, each R is individually a $C_1$ to $C_{10}$ alkyl, each $R_1$ is individually a $C_2$ to $C_{10}$ alkylene, and each $R_2$ is individually a $C_2$ to $C_{10}$ alkylene.

4. The charged pigment particle of claim 1, wherein the charged pigment particle is a blue colored cationic microparticle having the structure:

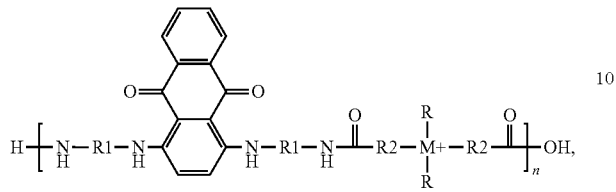

wherein M is N or P, each R is individually a $C_1$ to $C_{10}$ alkyl, each $R_1$ is individually a $C_2$ to $C_{10}$ alkylene, and each $R_2$ is individually a $C_2$ to $C_{10}$ alkylene.

5. The charged pigment particle of claim 1, wherein the charged pigment particle is a yellow colored cationic microparticle having the structure:

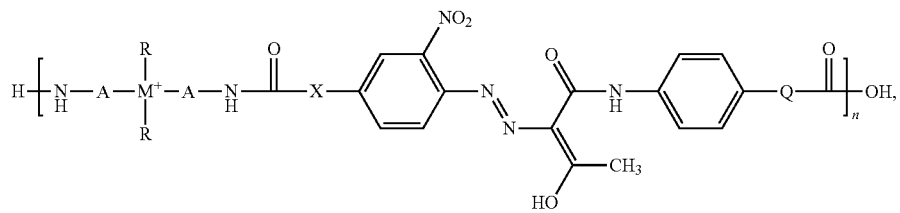

wherein M is N or P, each R is individually a $C_1$ to $C_{10}$ alkyl, and each A, X, and Q are individually a $C_2$ to $C_{10}$ alkylene.

6. The charged pigment particle of claim 1, wherein the charged pigment particle is a yellow colored cationic microparticle having the structure:

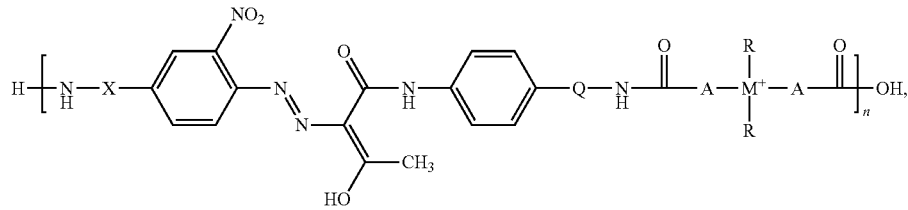

wherein M is N or P, each R is individually a $C_1$ to $C_{10}$ alkyl, and each A, X, and Q are individually a $C_2$ to $C_{10}$ alkylene.

7. A charged pigment particle comprising an alternating copolymer of a chromophore and a charged linker molecule, wherein the chromophore is selected from the group consisting of:

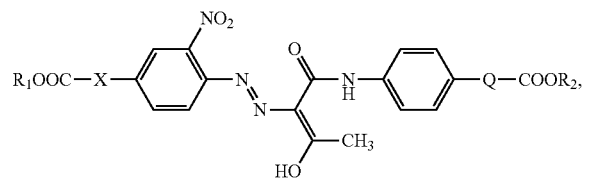

analogs thereof, and derivatives thereof, wherein $R_1$ and $R_2$ are one of —H and -succinimide, and X and Q are each individually a $C_2$ to $C_{10}$ alkylene;

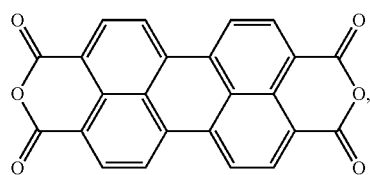 [SMILES: O=C1OC(=O)c2ccc3c4ccc5c6c(ccc(c7ccc1c2c73)c64)C(=O)OC5=O]

analogs thereof, and derivatives thereof;

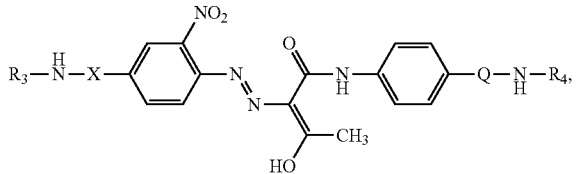

analogs thereof, and derivatives thereof, wherein $R_3$ and $R_4$ are —H, and X and Q are each individually a $C_2$ to $C_{10}$ alkylene;

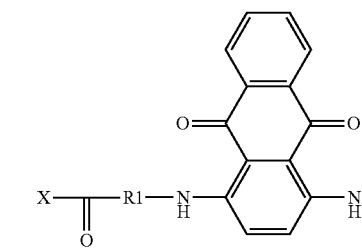

analogs thereof, and derivatives thereof, wherein each $R_1$ is individually a $C_2$ to $C_{10}$ alkylene, and each X is one of —OH or —O-succinimide; and

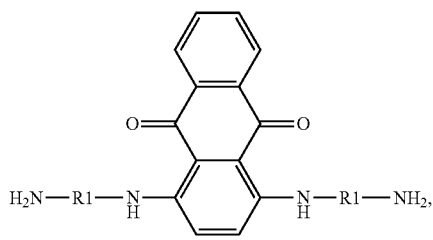

analogs thereof, and derivatives thereof, wherein each $R_1$ is individually a $C_2$ to $C_{10}$ alkylene.

8. The charged pigment particle of claim 7, wherein the charged linker molecule comprises cations selected from the group consisting of quaternary ammonium, quaternary phosphonium, quaternary arsonium, quaternary stibonium, ternary sulfonium cations, or combination thereof.

9. A charged pigment particle comprising an alternating copolymer of a chromophore and a charged linker molecule, wherein the charged linker molecule is selected from the group consisting of:

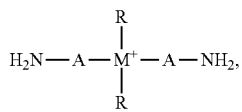

analogs thereof, and derivatives thereof, wherein M is N or P, each R is individually a $C_1$ to $C_{10}$ alkyl, and each A is individually a $C_2$ to $C_{10}$ alkylene;

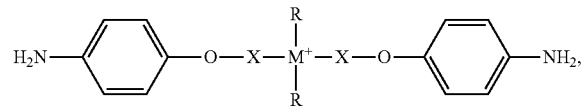

analogs thereof, and derivatives thereof, wherein M is N or P, each R is individually a $C_1$ to $C_{10}$ alkyl, and each X is individually a $C_2$ to $C_{10}$ alkylene;

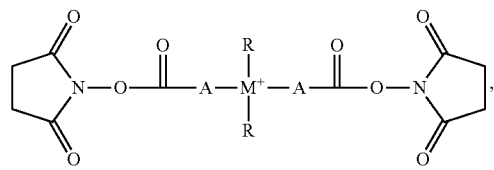

analogs thereof, and derivatives thereof, wherein M is N or P, each R is individually a $C_1$ to $C_{10}$ alkyl, and each A is individually a $C_2$ to $C_{10}$ alkylene;

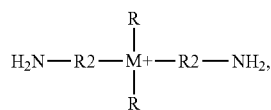

analogs thereof, and derivatives thereof, wherein M is N or P, each R is individually a $C_1$ to $C_{10}$ alkyl, and each $R_2$ is individually a $C_2$ to $C_{10}$ alkylene; and

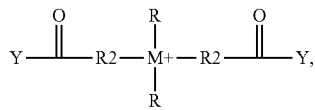

analogs thereof, and derivatives thereof, wherein M is N or P, each R is individually a $C_1$ to $C_{10}$ alkyl, and each $R_2$ is individually a $C_2$ to $C_{10}$ alkylene, and each Y is one of —OH or —O-succinimide.

10. The charged pigment particle of claim 9, wherein the chromophore is a dicarbonyl moiety, a diamine moiety, a dicarboxylic acid, a diacyl halide, a dianhydride, a diester, a dialdehyde, a diketone, or a combination thereof.

* * * * *

UNITED STATES PATENT AND TRADEMARK OFFICE
CERTIFICATE OF CORRECTION

PATENT NO. : 9,846,345 B2
APPLICATION NO. : 14/771400
DATED : December 19, 2017
INVENTOR(S) : Klein It is certified that error appears in the above-identified patent and that said Letters Patent is hereby corrected as shown below:

In the Specification

In Column 9, Line 52, delete "Δt least" and insert -- At least --, therefor.

In Column 11, Lines 25-26, delete "are —O-succinimide Bis-NHS-esters" and insert -- are —O-succinimide. Bis-NHS-esters --, therefor.

Signed and Sealed this
Eighth Day of May, 2018

Andrei Iancu
*Director of the United States Patent and Trademark Office*